Aug. 29, 1933.  A. GERSTENBERGER  1,924,276
AUTOMOBILE LIFTING MECHANISM
Filed Sept. 7, 1932
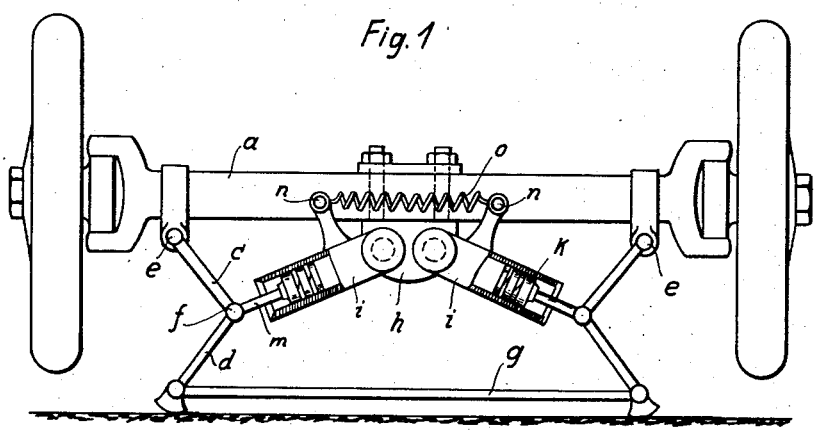
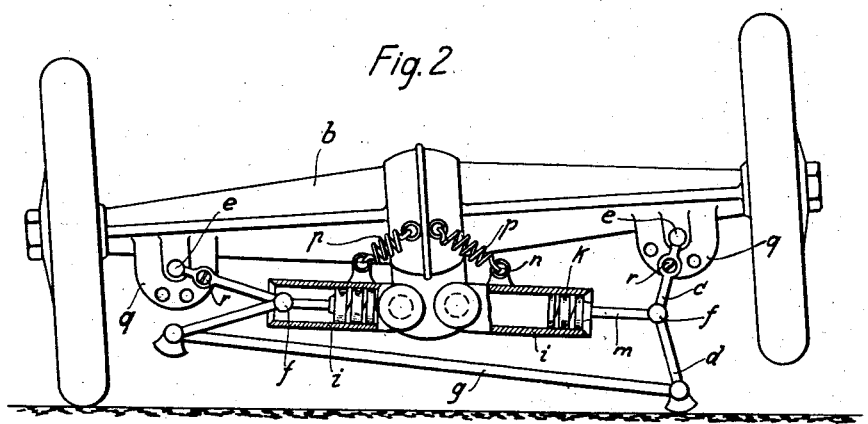
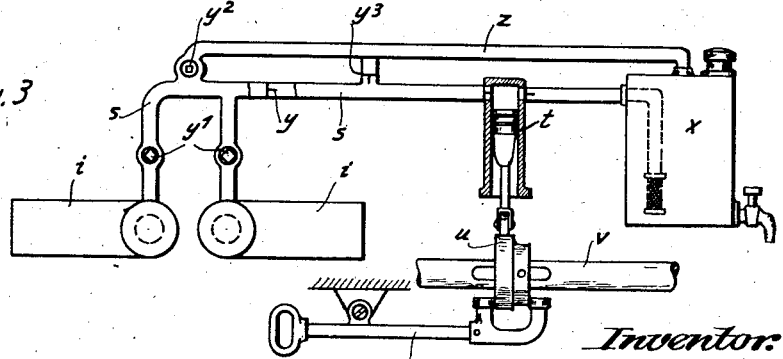
Inventor:
Alfred Gerstenberger Patented Aug. 29, 1933

1,924,276

UNITED STATES PATENT OFFICE 1,924,276

AUTOMOBILE LIFTING MECHANISM

Alfred Gerstenberger, Leipzig, Germany

Application September 7, 1932, Serial No. 631,963, and in Germany November 14, 1931

3 Claims. (Cl. 254—86)

My invention has reference to a novel mechanism for lifting automobiles of any type. Hitherto, it has been the practice to use for the said purpose a jack, but experience has taught that handling, placing in position, and operating such a jack requires much time and skill, to say nothing of the fact that an axle when lifted by the jack, runs the risk to slide off the jack through accident or mistake, that a plurality of jacks must be employed in the case that both axles of an automobile have to be raised at the same time, and that, finally, accommodation of a jack or jacks within a passenger car presents difficulties.

My invention is intended to obviate all these disadvantages by the provision of a mechanically operated device, which is in firm connection with the motor car and apt for ready use. The special novelty of the invention consists in the arrangement of foldably made rods pivotally connected to each axle of a car and connected at their free ends with each other by a bar. Another object of the invention consists in the provision of cylinders adapted for operation by a pressure means and pivotally fastened to each axle, the piston rods of these cylinders being each in pivotal connection with one of the said rod members and designed to operate these rod members in such a manner as to cause them, either separately or in unison, to come in contact with the ground for the purpose of raising one wheel, or one axle, or the whole chassis above the surface of the ground, as the case may be.

With these objects in view, my invention consists of a lifting mechanism of the general character stated, which embodies the peculiar and novel features of construction, fully explained in the following detailed description, specifically stated in the appended claims, and illustrated in the accompanying drawing, in which—

Fig. 1 is an elevation of the lifting device mounted on the front axle of a car and shown in operative position, Fig. 2 is an elevation of the lifting device mounted on the rear axle, the arrangement being partially shown in folded position and partially in operative position, and Fig. 3 illustrates in elevation the connection of the high pressure pump with the reservoir and the oil pressure conduit.

In the practical development of my invention, my improved lifting device comprises rods $c$ and $d$ hingedly connected with each other at $f$ so as to form pairs of levers having the shape of a V and adapted to be folded together or stretched out about their hinge. In the present instance, there are provided four pairs of levers, and the arrangement is made so that the rods $c$ of each pair of levers are pivoted, at $e$, to the extremities of the front axle $a$ of a car (not shown) and of the rear axle $b$, respectively. The lower ends of the lever arms $d$ are connected with each other by a bar $g$.

To the underface of each axle, and in the centre thereof there is mounted a bearing flange $h$, and to this flange are pivotally fastened two cylinders $i$, the said cylinders being disposed in opposite directions to each other and provided with pistons $k$ which are adapted for operation by pressure oil. The rods $m$ of said pistons are in connection with the hinges $f$ of the V-shaped levers, and on operation of the pistons, the rods $m$ force the lever arms $c$, $d$ first into a right-angled position, then into an obtuse-angled position, and finally into the dead-angled position.

Each cylinder carries an eye $n$ fastened to the body of each cylinder laterally thereof, so as to project in upward direction therefrom. In the construction shown in Figure 1, the eyes $n$ of both cylinders $i$ are connected with each other by one tension spring, as at $o$, and in the modification shown in Figure 2, each one cylinder $i$ is controlled by a separate tension spring, as at $r$, fastened to each eye $n$ and to the axle $b$, respectively. These tension springs serve the purpose to bring the cylinders $i$ from their downwardly inclined position automatically back to their initial position and to move the lever arms about their pivot $e$, thereby causing said arms to occupy a raised position. To hold the lever arms in more or less raised position, there is fastened to the axle, in proximity to each pivot $e$ (as shown in Figure 2), a plate $q$ of semi-circular shape, this plate being provided with a plurality of openings, adapted for the reception of a bolt $r$ made for this purpose to pass through an aperture in the upper rod $c$ of the lever arrangement.

All of the cylinders $i$ are by means of an oil pressure conduit $s$ in communication with the high pressure pump $t$ driven by the cam $u$. The latter is mounted shiftable on the secondary shaft $v$ driven from the motor, and a throw-out sliding member $w$ adapted to be locked in its end positions, is provided for the purpose of forcing the said cam into or out of operative position. The pump $t$ sucks up oil from the reservoir $x$ and forces said oil into the cylinders $i$, a check valve $y$ being interposed between pump and cylinders. In the pressure conduit, there are further arranged, short of each cylinder, a stop valve $y^1$, the said stop valves being intended for selective operation of one cylinder or of both cylinders. The pressure conduit $s$ is in communication with the discharge conduit $z$ which has for its office to bring the oil back to said reservoir, after a valve $y^2$ has been opened. Finally, a safety valve $y^3$ is arranged within the short pipe communicating with the conduits $s$ and $z$, respectively, for the purpose of causing oil to flow from the pressure conduit directly into said conduit $z$, in case of the delivery pressure being too high.

In use, the device may be operated as follows. The cam $u$ is by the actuation of the throw-out sliding member $w$ shifted along the secondary shaft $v$ into operative position, and the pump $t$ started. The stop valves $y^1$ (or one stop valve $y^1$, as the case may be) having been opened, pressure oil is caused to enter the cylinders $i$, or one of the cylinders, the pistons $k$, or one piston, are moved in outward direction. The piston rods $m$ exert pressure upon the hinges $f$ and force the V-shaped lever arms to open. The said arms swing about their pivot $e$ into a position where they are in contact with the ground, and on continuing operation of the pistons, the stretched out lever arms lift the whole car, or one axle, or one wheel only, as the case may be. Then the device is locked by the bolt $r$ in the manner described. During the operation of the pistons and the lever rods, the cylinders are swung into a downwardly inclined position, and their springs stretched. To bring the device automatically back to its initial position, it is only necessary to withdraw the locking bolt $r$ and to open the discharge valve $y^2$.

It will be seen from the foregoing that the construction is exceptionally simple and effective, and it may be said, that excellent results have been obtained from the details disclosed. However, it is to be understood that I do not intend to be confined to the precise details of construction shown and described.

I claim:

1. An automobile lifting mechanism in combination with the axles of a motor car, comprising arms hingedly connected together and constituting V-shaped pairs of levers which are pivotally fastened to both extremities of said axles, a bar connecting the free ends of the lower lever arms with each other, plates of semi-circular shape fastened to the axles in proximity to said pivotal connections, openings in said plates and an opening in the upper arm of each pair of levers, the said openings being adapted for the reception of a bolt for locking purposes, and means for swinging said lever arms about their pivots into operative position to lift the car or parts thereof above the surface of the ground.

2. An automobile lifting mechanism in combination with the axles of a motor car, comprising arms hingedly connected together and constituting V-shaped pairs of levers which are pivotally fastened to both extremities of said axles, a bar connecting the free ends of the lower lever arms with each other, plates of semi-circular shape fastened to the axles in proximity to said pivotal connections, openings in said plates and an opening in the upper arm of each pair of levers, the said openings being adapted for the reception of a bolt for locking the pairs of levers in their end positions, means for operating said pairs of levers, this means comprising pairs of cylinders, flanged members fastened to the axles and downwardly projecting therefrom, said flanged members serving for pivotal attachment of said pairs of cylinders which are disposed in opposite directions, an eye fixed to each cylinder laterally thereof and projecting upwardly therefrom, a tension spring connecting each two eyes together, pistons within said cylinders, rods to said pistons, these rods being connected to the hinges of said V-shaped pairs of levers, and means of operating said pistons and piston rods for the purpose of swinging said pairs of levers about their pivots into ground engaging position to lift the car or parts thereof above the surface of the ground.

3. An automobile lifting mechanism in combination with the axles of a motor car, comprising arms hingedly connected together and constituting V-shaped pairs of levers which are pivotally fastened to both extremities of said axles, a bar connecting the free ends of the lower lever arms with each other, plates of semi-circular shape fastened to the axles in proximity to said pivotal connections, openings in said plates and an opening in the upper arm of each pair of levers, the said openings being adapted for the reception of a bolt for locking the pairs of levers in their end positions, means for operating said pairs of levers, this means comprising pairs of cylinders, flanged member fastened to the axles and downwardly projecting therefrom, said flanged members serving for pivotal attachment of said pairs of cylinders which are disposed in opposite directions to one another, an eye fixed to each cylinder laterally thereof and projecting upwardly therefrom, tension springs, each tension spring connecting one of said eyes with the body of the axle, pistons within said cylinders, rods to said pistons, these rods being connected to the hinges of said V-shaped pairs of levers, means for operating said pistons and piston rods, this means comprising a high pressure pump, an oil pressure conduit in communication with said pump adapted to suck up oil from a tank, a secondary shaft, a cam for driving said pump, this cam being mounted shiftable on said secondary shaft, a throw-out sliding member designed to force said cam into or out of operative position, a check valve interposed between pump and cylinders into which said oil pressure conduit opens, stop valves arranged within said oil pressure conduit and intended for selective operation of one cylinder or of both cylinders at a time, a discharge conduit for bringing the oil back to said tank, a safety valve disposed within the communication between said oil pressure conduit and said discharge conduit, the said pressure oil when admitted into said cylinders, forcing their pistons out-wardly and causing swinging of said pairs of levers about their pivots into ground engaging position to lift the car or parts thereof, the said cylinders being during this operation swung about their pivots into an inclined, downwardly directed position thereby tensioning their springs which, after opening the said safety valve, bring the said cylinders and the said V-shaped pairs of levers automatically back to their initial positions above the surface of the ground, the appliance of said locking member holding said pairs of levers in raised position.

ALFRED GERSTENBERGER.